(12) United States Patent
Ohno

(10) Patent No.: US 9,482,134 B2
(45) Date of Patent: Nov. 1, 2016

(54) CONTROL METHOD FOR REDUCING AGENT SUPPLY APPARATUS AND REDUCING AGENT SUPPLY APPARATUS

(71) Applicant: Bosch Corporation, Tokyo (JP)

(72) Inventor: Shigehiro Ohno, Saitama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 14/653,640

(22) PCT Filed: Dec. 19, 2013

(86) PCT No.: PCT/JP2013/084065
§ 371 (c)(1),
(2) Date: Jun. 18, 2015

(87) PCT Pub. No.: WO2014/103869
PCT Pub. Date: Jul. 3, 2014

(65) Prior Publication Data
US 2015/0308317 A1   Oct. 29, 2015

(30) Foreign Application Priority Data

Dec. 26, 2012   (JP) .................................. 2012-282777

(51) Int. Cl.
*F01N 3/00* (2006.01)
*F01N 3/20* (2006.01)
(Continued)

(52) U.S. Cl.
CPC ............... *F01N 3/208* (2013.01); *B01D 53/90* (2013.01); *F01N 3/2066* (2013.01); *F01N 9/00* (2013.01);
(Continued)

(58) Field of Classification Search
CPC ............... F01N 2610/1466; F01N 2610/1473; F01N 2610/1493
See application file for complete search history.

(56) References Cited

U.S. PATENT DOCUMENTS

2008/0148716 A1* 6/2008 Nishibu ................ F01N 3/2066
60/295
2009/0277162 A1* 11/2009 Cominetti .............. B01D 53/90
60/297
(Continued)

FOREIGN PATENT DOCUMENTS

EP          2151559      2/2010
JP       2005248823      9/2005
(Continued)

OTHER PUBLICATIONS

International Search Report for Application No. PCT/JP2013/084065 dated Apr. 1, 2014 (English Translation, 2 pages).

*Primary Examiner* — Jesse Bogue
(74) *Attorney, Agent, or Firm* — Michael Best & Friedrich LLP

(57) ABSTRACT

To provide a reducing agent supply apparatus that makes it hard to refill the pump side with a liquid reducing agent upon completion of the suck back control of the liquid reducing agent and a method for control the reducing agent supply apparatus.
The method for controlling the reducing agent supply apparatus pressure-feeds the liquid reducing agent in a storage tank using a pump and injects the liquid reducing agent into an exhaust passage of the internal combustion engine through a reducing agent injection valve when the internal combustion engine is operating and, when the internal combustion engine stops, sucks the liquid reducing agent remaining in a reducing agent supply path back to the storage tank, in which the suck back control starts when the internal combustion engine stops and, when the suck back control ends, a reducing agent passage interconnecting the pump and the storage tank is opened to air.

4 Claims, 5 Drawing Sheets

(51) Int. Cl.
    *B01D 53/90*     (2006.01)
    *F01N 9/00*     (2006.01)

(52) U.S. Cl.
    CPC ........ *F01N 2610/02* (2013.01); *F01N 2610/14* (2013.01); *F01N 2610/144* (2013.01); *F01N 2610/1406* (2013.01); *F01N 2610/146* (2013.01); *F01N 2610/1466* (2013.01); *F01N 2610/1473* (2013.01); *F01N 2610/1486* (2013.01); *F01N 2610/1493* (2013.01); *F01N 2900/0422* (2013.01); *F01N 2900/1808* (2013.01); *F01N 2900/1821* (2013.01); *F01N 2900/1822* (2013.01); *Y02T 10/24* (2013.01); *Y02T 10/47* (2013.01)

(56) References Cited

U.S. PATENT DOCUMENTS

| | | | |
|---|---|---|---|
| 2010/0199648 A1* | 8/2010 | Op De Beeck | F01N 3/2066 60/303 |
| 2010/0205948 A1* | 8/2010 | Bauer | F01N 3/2066 60/303 |
| 2010/0319317 A1* | 12/2010 | Oberski | F01N 3/208 60/274 |
| 2011/0099983 A1 | 5/2011 | Ohno | |
| 2012/0020857 A1* | 1/2012 | Isada | F01N 3/208 423/212 |
| 2013/0000743 A1* | 1/2013 | Crary | F01N 3/2066 137/15.04 |

FOREIGN PATENT DOCUMENTS

| | | |
|---|---|---|
| JP | 2008151094 | 7/2008 |
| JP | 2009002260 | 1/2009 |
| JP | 2010007617 | 1/2010 |
| JP | 201024896 | 2/2010 |
| JP | 201084694 | 4/2010 |
| JP | 2010255608 | 11/2010 |
| JP | 20111895 | 1/2011 |

\* cited by examiner

| 41 | RECOVERY CONTROL INSTRUCTING UNIT |
| 45 | PUMP DRIVING CONTROL UNIT |
| 43 | PASSAGE SELECTOR VALVE DRIVING CONTROL UNIT |
| 47 | REDUCING AGENT INJECTION VALVE DRIVING CONTROL UNIT |
| 49 | THREE-WAY SELECTOR VALVE DRIVING CONTROL UNIT |

CONTROL METHOD FOR REDUCING AGENT SUPPLY APPARATUS AND REDUCING AGENT SUPPLY APPARATUS

BACKGROUND OF THE INVENTION

The present invention relates to a reducing agent supply apparatus that supplies a liquid reducing agent in the exhaust passage of an internal combustion engine and makes control so as to suck the liquid reducing agent remaining in a reducing agent supply path back to a storage tank when an internal combustion engine stops and a method for controlling such a reducing agent supply apparatus.

Nitrogen oxide ($NO_X$) is included in exhaust gas of an internal combustion engine installed in a vehicle or the like. As one exhaust purifying apparatus for purifying $NO_X$, there is a known exhaust purifying apparatus that includes a selective reduction catalyst in the exhaust passage of the internal combustion engine and a reducing agent supply apparatus for injecting a liquid reducing agent such as an aqueous urea solution derived from ammonia upstream of the selective reduction catalyst. This exhaust purifying apparatus performs the reduction reaction of $NO_X$ in exhaust gas and ammonia generated from the liquid reducing agent in the selective reduction catalyst to efficiently decompose $NO_X$ to nitrogen, water, or the like.

As an aspect of a reducing agent supply apparatus used in such an exhaust purifying apparatus, there is a reducing agent supply apparatus that includes a pump and a reducing agent injection valve, pressure-feeds the liquid reducing agent in the storage tank using the pump, and supplies the liquid reducing agent into the exhaust pipe via the reducing agent injection valve fixed to an exhaust pipe.

When an aqueous urea solution is used as the liquid reducing agent, the aqueous urea solution preferably has a concentration that makes the freeze temperature lowest to prevent the freezing of the aqueous urea solution as much as possible. However, the freeze temperature of an aqueous urea solution is at least approximately −11 degrees and the aqueous urea solution may freeze in the time period in which the supplying of an aqueous urea solution is stopped in cold climate areas or the like. In addition, in the time period in which the supplying of an aqueous urea solution is stopped, the concentration increases because water in the aqueous urea solution evaporates and the melting point of the aqueous urea solution rises, possibly causing the freezing easily.

When the aqueous urea solution freezes, the unfreeze time at the next startup becomes long or the expanded volume may damage components of the reducing agent supply apparatus. Accordingly, when the internal combustion engine is stopped, control is generally performed so that the aqueous urea solution remaining in the reducing agent supply apparatus is sucked back to the storage tank. The suck back control of the aqueous urea solution is performed by reversely rotating the pump for pressure-feeding the aqueous urea solution or performing switching between passages of the aqueous urea solution to decompress the supply path for the aqueous urea solution. The suck back control of the aqueous urea solution is performed by driving the pump with the reducing agent injection valve opened for a predetermined period (for example, see JP-A-2010-007617).

SUMMARY OF THE INVENTION

If there is overall or partial clogging in the injection hole of the reducing agent injection valve or at a midpoint of the reducing agent supply path because of crystallization of urea in the aqueous urea solution, an excess negative pressure is generated in the reducing agent supply apparatus during suck back operation of the aqueous urea solution. If an excess negative pressure is present at an end of the suck back control, the pump side is refilled with the aqueous urea solution from the storage tank after the driving of the pump is stopped, possibly causing the freezing of the aqueous urea solution or an unexpected injection at the next startup.

The invention has been devised to solve such problems and an object of the invention is to provide a reducing agent supply apparatus that makes it hard to refill the pump side with the liquid reducing agent after the suck back control of the liquid reducing agent and a method for control such a reducing agent supply apparatus.

According to the present invention, the above problems are solved by providing a method for controlling a reducing agent supply apparatus that pressure-feeds a liquid reducing agent in a storage tank using a pump and injects the liquid reducing agent into an exhaust passage of an internal combustion engine through a reducing agent injection valve when the internal combustion engine is operating and, when the internal combustion engine stops, sucks the liquid reducing agent remaining in a reducing agent supply path back to the storage tank, in which the suck back control starts when the internal combustion engine stops and, when the suck back control ends, a reducing agent passage interconnecting the pump and the storage tank is opened to air.

That is, in the method for controlling the reducing agent supply apparatus according to the invention, since the reducing agent passage interconnecting the pump and the storage tank is opened to air when the suck back control of the liquid reducing agent ends, it is possible to prevent the pump side from being refilled with the liquid reducing agent in the storage tank even if an excess negative pressure remains in the reducing agent supply path.

In addition, in performing the method for controlling the reducing agent supply apparatus according to the invention, it is preferable that the reducing agent passage is provided with a three-way selector valve, the pump communicates with the storage tank when the suck back control is carried out, and the pump is stopped and then the reducing agent passage near the pump is opened to air when the suck back control ends.

If the three-way selector valve is switched in this way, the liquid reducing agent does not flow toward the open air side and the valve near the open air side is not locked by frozen or solidified liquid reducing agent. As a result, failures in passage switching operation can be reduced.

According to another aspect of the invention is a reducing agent supply apparatus capable of sucking a liquid reducing agent remaining in a reducing agent supply path back to a storage tank when an internal combustion engine stops, the apparatus including a storage tank storing the liquid reducing agent, a pump pressure-feeding the liquid reducing agent in the storage tank, and a reducing agent injection valve injecting the pressure-fed liquid reducing agent into an exhaust passage of an internal combustion engine, in which a reducing agent passage interconnecting the pump and the storage tank is provided with a three-way selector valve, the three-way selector valve is switchable between a first state in which the pump communicates with the storage tank and a second state in which the reducing agent passage near the pump is opened to air, and the first state is reached when the suck back control is carried out and the second state is reached when the suck back control ends.

That is, since the reducing agent supply apparatus according to the invention is provided with the three-way selector valve that opens the reducing agent passage interconnecting the pump and the storage tank to air when the suck back control of the liquid reducing agent ends, it is possible to prevent the pump side from being refilled with the liquid reducing agent in the storage tank even if an excess negative pressure remains in the reducing agent supply path.

In configuring the reducing agent supply apparatus according to the invention, the three-way selector valve is preferably provided at a position in the reducing agent passage near the storage tank closer to the pump than an end of the reducing agent passage. By providing the three-way selector valve at the position closer to the pump, the volume of the reducing agent passage between the three-way selector valve and the pump can be reduced, thereby reducing the refill amount of the pump side.

DETAILED DESCRIPTION

Figure 1:
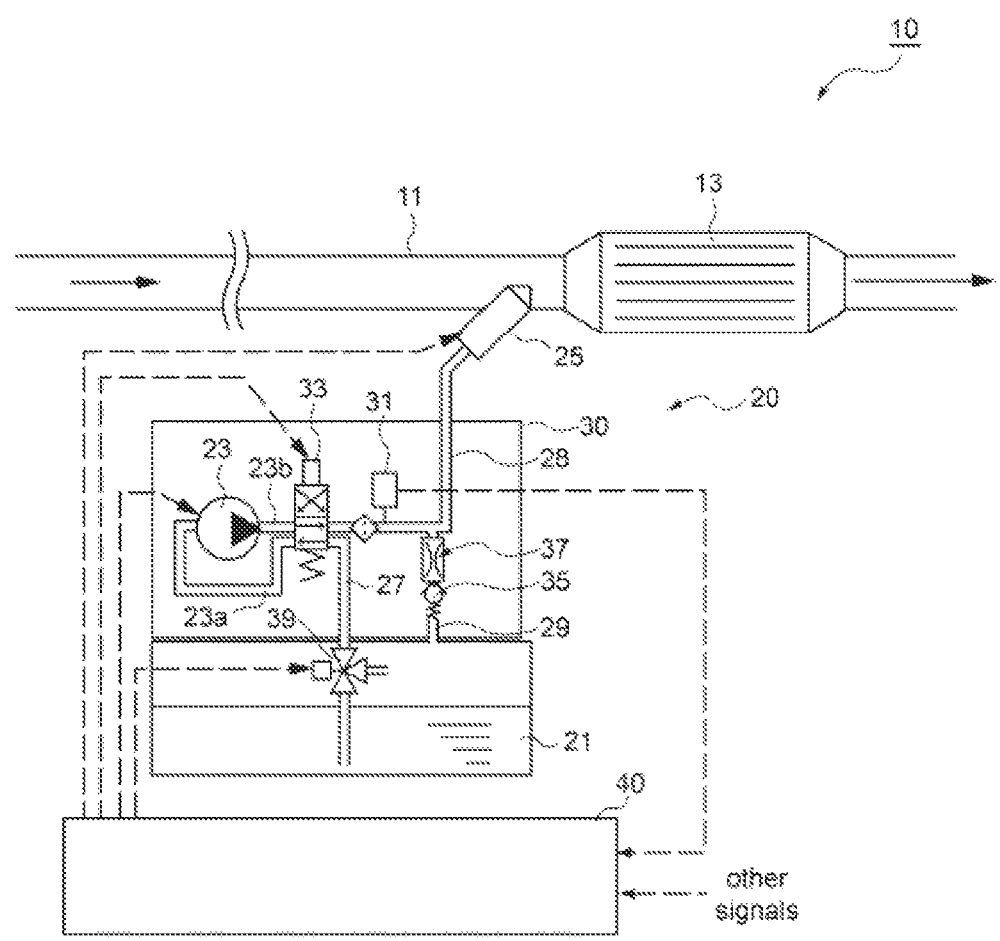
FIG. 1 is an overall view showing an example of the structure of an exhaust purifying apparatus including a reducing agent supply apparatus according to an embodiment of the present invention.

A reducing agent supply apparatus and a method for controlling the reducing agent supply apparatus according to embodiments of the present invention will be specifically described with reference to the drawings as appropriate.

In the drawings, the components with the same reference sign represent the same member unless otherwise specified and descriptions are omitted as appropriate.

1. Overall Structure of Exhaust Purifying Apparatus

FIG. 1 is an overall view showing an example of the overall structure of an exhaust purifying apparatus 10 including a reducing agent supply apparatus 20 according to a first embodiment of the present invention.

The exhaust purifying apparatus 10 purifies $NO_X$ in exhaust gas and is provided in an exhaust passage 11 of an internal combustion engine (not shown) such as a diesel engine. The exhaust purifying apparatus 10 includes a reduction catalyst 13 provided at a midpoint in an exhaust passage 11 and the reducing agent supply apparatus 20 for supplying a liquid reducing agent in the exhaust passage 11 upstream of the reduction catalyst 13.

The reduction catalyst 13 has a function of promoting the reduction of $NO_X$ in exhaust gas. The reduction catalyst 13 also absorbs ammonia generated from the liquid reducing agent and selectively reduces $NO_X$ in exhaust gas flowing into the catalyst by using ammonia. The supply apparatus 20 according to the embodiment uses an aqueous urea solution as the liquid reducing agent and the aqueous urea solution undergoes thermal decomposition or hydrolytic decomposition in the exhaust passage 11 to generate ammonia.

2. Reducing Agent Supply Apparatus (1) Basic Structure

In FIG. 1, the reducing agent supply apparatus 20 includes a storage tank 21 storing the liquid reducing agent, a pump unit 30 pressure-feeding the liquid reducing agent, and a reducing agent injection valve 25 injecting the liquid reducing agent into the exhaust passage 11. The pump unit 30 includes a pump 23 and a passage selector valve 33. The reducing agent injection valve 25, the pump 23, and the passage selector valve 33 are driven and controlled by an ECU 40.

The pump 23 and the storage tank 21 are interconnected by a first reducing agent passage 27 and the pump 23 and the reducing agent injection valve 25 are interconnected by a second reducing agent passage 28. Of these, the second reducing agent passage 28 is provided with a pressure sensor 31 as pressure detection means for detecting the pressure in the second reducing agent passage 28, that is, the pressure of the liquid reducing agent pressure-fed into the reducing agent injection valve 25. Connections between the pump 23 and the first and second reducing agent passages 27 and 28 are made via the passage selector valve 33. An end of the first reducing agent passage 27 near the storage tank 21 is positioned in the vicinity of the bottom of the storage tank 21 so as to suck up the liquid reducing agent.

The passage selector valve 33 has a function of switching the flow direction of the liquid reducing agent pressure-fed by the pump 23 between the positive direction from the storage tank 21 side to the reducing agent injection valve 25 side and the reverse direction from the reducing agent injection valve 25 side to the storage tank 21 side. In the reducing agent supply apparatus 20 according to the embodiment, the passage selector valve 33 is configured to cause the first reducing agent passage 27 to communicate with an entrance side 23*a* of the pump 23 and the second reducing agent passage 28 to communicate with an exit side 23*b* of the pump 23 in the non-energization state or cause the first reducing agent passage 27 to communicate with the exit side 23*b* of the pump 23 and the second reducing agent passage 28 to communicate with the entrance side 23*a* of the pump 23 in the energization state.

That is, in the operating state of the internal combustion engine, the passage selector valve 33 is not energized to supply the liquid reducing agent to the reducing agent injection valve 25 side. In contrast, when the internal combustion engine stops, the passage selector valve 33 is energized to suck the liquid reducing agent in the reducing agent supply apparatus 20 back to the storage tank 21.

The structure in which the liquid reducing agent can be sucked back to the storage tank 21 when the internal combustion engine stops is not limited to the example in which the passage selector valve 33 is provided. For example, the liquid reducing agent can be sucked back using a pump that can rotate reversely.

In addition, a return passage 29 having the other end connected to the storage tank 21 is branched from a midpoint in the second reducing agent passage 28. The end of the return passage 29 near the storage tank 21 is connected to a gaseous phase section in the storage tank 21.

The storage tank 21 is provided with an air blizzard or the like to keep the internal pressure to the atmospheric pressure.

A narrow section 37 having a small passage area is provided at a midpoint in the return passage 29 to increase the pressure in the second reducing agent passage 28. In addition, a one-way valve 35 is provided at a position in the return passage 29 closer to the storage tank 21 than the narrow section 37 to prevent the liquid reducing agent from flowing from the storage tank 21 side to the second reducing agent passage 28 side. The one-way valve 35 may be omitted.

Although the pressure sensor 31 is provided in the pump unit 30 in the reducing agent supply apparatus 20 according to the embodiment, the pressure sensor 31 may be provided in any position in the second reducing agent passage 28.

The pump 23 pressure-feeds the liquid reducing agent at a predetermined flow rate under energization control by the ECU 40. In the embodiment, the pump 23 includes an electromagnetically-driven pump and the output (discharge flow rate) of the pump 23 increases with the driving duty ratio.

During injection control of the liquid reducing agent, the feedback control of an output of the pump 23 is performed so that the pressure value (referred to below as "the detected pressure") Pu in the second reducing agent passage 28 detected by the pressure sensor 31 is kept to a predetermined target pressure Pu_tgt. Specifically, the ECU 40 performs the PID control of the output of the pump 23 based on the difference ΔPu between the detected pressure Pu detected by the pressure sensor 31 provided in the second reducing agent passage 28 and the predetermined target pressure Pu_tgt while circulating the liquid reducing agent pressure-fed to the second reducing agent passage 28 to the storage tank 21 via the return passage 29.

In addition, when the liquid reducing agent is sucked back to the storage tank 21, the output of the pump 23 is fixed to a preset constant state. However, also in the suck back control of the liquid reducing agent, the output of the pump 23 may be controlled while monitoring the state of a negative pressure in the second reducing agent passage 28.

The reducing agent injection valve 25, which is opened or closed by energization control, injects a predetermined amount of the liquid reducing agent into the exhaust passage 11. In the embodiment, the reducing agent injection valve 25 includes an electromagnetic on-off valve, which is closed in the non-energization state or opened in the energization state. The ECU 40 obtains the target pressure amount Qdv_tgt based on a predetermined computation expression, determines the driving duty ratio for each predetermined injection cycle according to the target pressure amount Qdv_tgt by assuming the detected pressure Pu in the second reducing agent passage 28 to be the target pressure Pu_tgt, and performs energization control of the reducing agent injection valve 25. The driving duty ratio of the reducing agent injection valve 25 represents the ratio of the valve open time to one injection cycle.

In addition, a three-way selector valve 39 is provided in the first reducing agent passage 27 interconnecting the pump 23 and the storage tank 21. This three-way selector valve 39 is switchable between the first state in which the passage near the pump 23 communicates with the storage tank 21 side and the second state in which the passage near the pump 23 is opened to air. The energization control of the three-way selector valve 39 is performed by the ECU 40, and the first state is reached when energization is performed or the second state is reached when energization is stopped.

In the three-way selector valve 39 included in the reducing agent supply apparatus 20 according to the embodiment, the passage near the storage tank 21 is blocked in the second state in which the first reducing agent passage 27 near the pump 23 is opened to air.

3. Electronic Control Unit (ECU)

Figure 2:
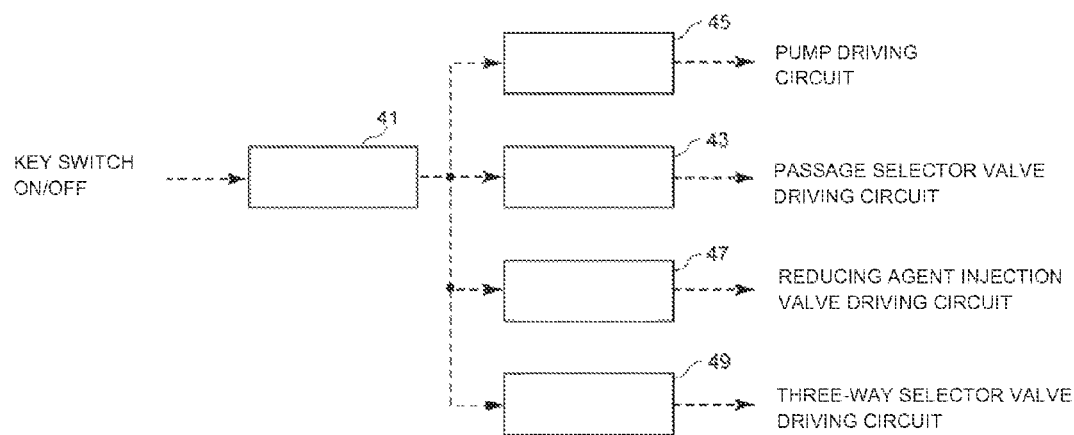
FIG. 2 is a block diagram showing an example of the structure of an electronic control unit.

FIG. 2 is a functional block diagram showing an example of the structure of components related to the suck back control of the liquid reducing agent of the ECU 40 according to the embodiment.

The structure of the ECU 40 is centered on a known microcomputer and includes a recovery control instructing unit 41, a passage selector valve control unit 43, a pump driving control unit 45, a reducing agent injection valve driving control unit 47, and a three-way selector valve driving control unit 49. Specifically, these units are achieved by causing the microcomputer to execute programs.

The ECU 40 further includes storage elements (not shown) such as a RAM (Random Access Memory) and a ROM (Read Only Memory), a timer counter, the pump 23, the passage selector valve 33, the reducing agent injection valve 25, a driving circuit for energizing the three-way selector valve 39, and so on. In addition, the ECU 40 receives on-off signals of the key switch of the internal combustion engine and a sensor value of the pressure sensor 31 and stores the value of the detected pressure Pu or the like in a storage element.

The recovery control instructing unit 41 generates the start command Sp1 of recovery control of the liquid reducing agent when, for example, the key switch of the internal combustion engine is turned off. In addition, the recovery control instructing unit 41 generates the end command Sp2 of recovery control after elapse of a predetermined time.

When the internal combustion engine stops, from the time the start command Sp1 of recovery control is generated until the end command Sp2 of recovery control is generated, the passage selector valve control unit 43 puts the passage selector valve 33 in the energization state and outputs a control signal for causing the liquid reducing agent to continue flowing in the reverse direction, to the driving circuit of the passage selector valve.

When the internal combustion engine stops, from the time the start command Sp1 of recovery control is generated until the end command Sp2 of recovery control is generated, the pump driving control unit 45 outputs a control signal to the driving circuit of the pump so that the pump 23 is driven at a predetermined constant output.

When the internal combustion engine stops, from the time the start command Sp1 of recovery control is generated until the end command Sp2 of recovery control is generated, the reducing agent injection valve driving control unit 47 outputs a control signal for keeping the reducing agent injection valve 25 in the open state, to the driving circuit of the reducing agent injection valve. In the embodiment, the reducing agent injection valve driving control unit 47 puts the reducing agent injection valve 25 in the open state, some time after starting the energization of the passage selector valve 33 and the driving of the pump 23.

When the internal combustion engine stops, from the time the start command Sp1 of recovery control is generated until the end command Sp2 of recovery control is generated, the three-way selector valve driving control unit 49 energizes the three-way selector valve 39 and outputs a control signal for causing the pump 23 to communicate with the storage tank 21 to the driving circuit of the three-way selector valve. In contrast, when recovery control ends, the three-way selector valve driving control unit 49 stops the energization of the three-way selector valve 39 and opens the first reducing agent passage 27 near the pump 23 to air.

4. Method for Controlling the Reducing Agent Supply Apparatus (1) Summary of Suck Back Control A summary of the suck back control of the liquid reducing agent performed by the ECU 40 in the reducing agent supply apparatus 20 according to the embodiment will be described below.

Figure 3:
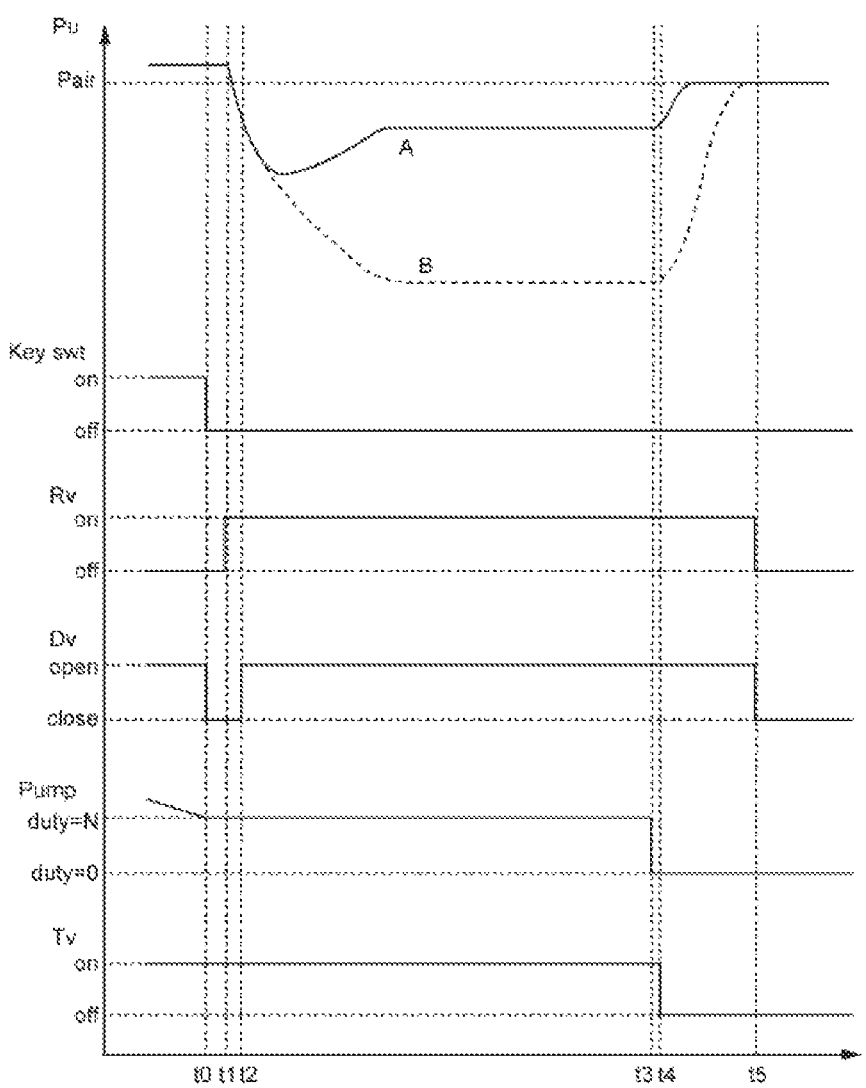
FIG. 3 is a timing chart showing an example of a method for controlling the reducing agent supply apparatus according to the embodiment of the invention.

FIG. 3 shows changes over time of the detected pressure Pu in the second reducing agent passage 28 when the reducing agent injection valve 25 clogs and when the reducing agent injection valve 25 does not clog, the driving state of the passage selector valve 33, the driving state of the reducing agent injection valve 25, the driving state of the pump 23, and the driving state of the three-way selector valve 39. In the graph indicating changes over time of the detected pressure Pu, the solid line A indicates a transition when clogging does not occur and the dashed line B indicates a transition when clogging occurs.

When the key switch of the internal combustion engine is turned off at t0, the reducing agent injection valve 25 is closed once and the output of the pump 23 is set to a predetermined value (duty=N). Next, the energization of the passage selector valve 33 is started at t1 so that the liquid reducing agent flows from the reducing agent injection valve 25 side to the storage tank 21 side. From t1, the detected pressure Pu in the second reducing agent passage 28 starts reducing.

After that, the reducing agent injection valve 25 is opened at t2. At this time, the detected pressure Pu in the second reducing agent passage 28 is lower than the atmospheric pressure Pair, that is, the state of a negative pressure. The reason why time is taken from when the energization of the passage selector valve 33 is started to when the reducing agent injection valve 25 is opened is that, if the reducing agent injection valve 25 is opened when the pressure in the second reducing agent passage 28 is a positive pressure, the liquid reducing agent leaks to the inside of the exhaust passage 11. By opening the reducing agent injection valve 25, exhaust gas (air) is introduced to the reducing agent supply path via the injection hole of the reducing agent injection valve 25 and the liquid reducing agent can be sucked back to the storage tank 21 efficiently.

If the reducing agent injection valve 25 does not clog after that, the detected pressure Pu in the second reducing agent passage 28 is kept in the state of a relatively small negative pressure (see the solid line A). In contrast, if the reducing agent injection valve 25 clogs, the pressure in the second reducing agent passage 28 is put in the state of an excess negative pressure (see the dashed line B).

Then, after elapse of a predetermined time (at t3), the driving of the pump 23 is stopped (duty=0), the energization of the three-way selector valve 39 is stopped at t4, and the first reducing agent passage 27 near the pump 23 is opened to air. This returns the detected pressure Pu in the second reducing agent passage 28 to the atmospheric pressure Pair. Since the first reducing agent passage 27 near the pump 23 does not communicate with the storage tank 21 at this time, even if the reducing agent injection valve 25 clogs and the second reducing agent passage 28 is put in the state of an excess negative pressure, the pump 23 side is not refilled with the liquid reducing agent in the storage tank 21.

Then, at t5, the energization of the passage selector valve 33 is stopped and the reducing agent injection valve 25 is closed to end the suck back control of the liquid reducing agent.

(2) Flowchart

Next, a specific example of the suck back control of the liquid reducing agent performed by the ECU 40 will be described based on the flowchart in FIG. 4. The following suck back control of the liquid reducing agent shown in the flowchart is performed when the internal combustion engine stops.

Figure 4:
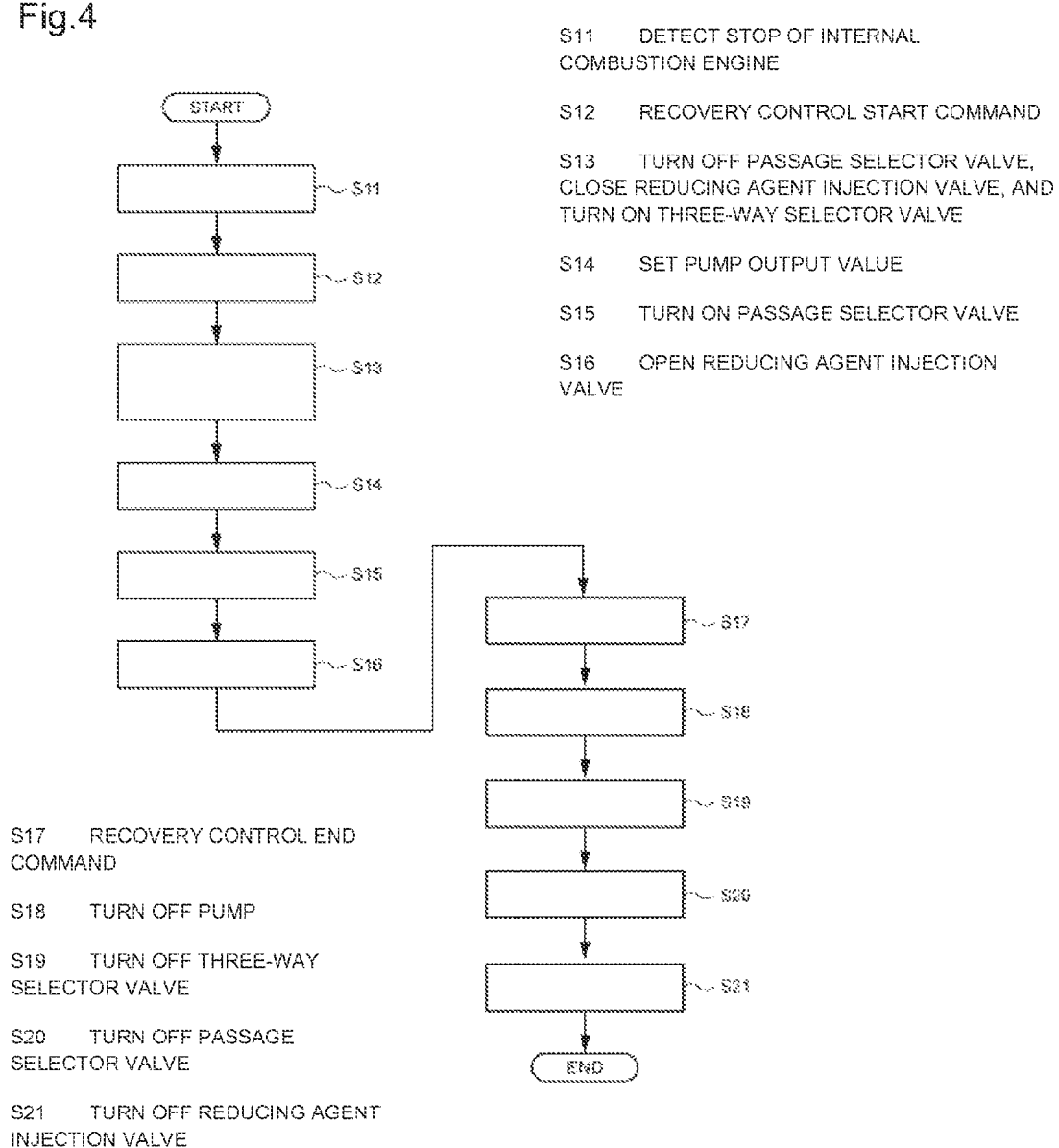
FIG. 4 is a flowchart showing an example of a method for controlling the reducing agent supply apparatus according to the embodiment of the invention.

First, when detecting in step S11 in FIG. 4 that the internal combustion engine has stopped, the ECU 40 generates a start command Sp1 of recovery control in step S12. Next, in step S13, the ECU 40 puts the passage selector valve 33 in the energization stop state, the reducing agent injection valve 25 in the close state, and the three-way selector valve 39 in the energization state.

Next, in step S14, the ECU 40 sets the output of the pump 23 to a predetermined value (duty=N) and drives the pump 23. Next, in step S15, the ECU 40 starts the energization of the passage selector valve 33 and switches the passage so that the liquid reducing agent flows from the reducing agent injection valve 25 side to the storage tank 21 side. This causes the pump 23 to start the sucking back of the liquid reducing agent. While the suck back control is performed, the detected pressure Pu in the second reducing agent passage 28 is kept in the state of a negative pressure.

After that, in step S16, the ECU 40 puts the reducing agent injection valve 25 in the energization state to open the valve. The reason why the reducing agent injection valve 25 is opened after a delay is that, if the valve is opened when the pressure in the second reducing agent passage 28 is a positive pressure, the liquid reducing agent may leak to the inside of the exhaust passage 11. However, the opening of the valve after a delay is not necessary for the invention.

Next, a predetermined time after starting the sucking back of the liquid reducing agent, the ECU 40 generates the end command Sp2 of the recovery control in step S17 and accordingly stops the driving of the pump 23 in step S18. In addition, in step S19, the ECU 40 stops the energization of the three-way selector valve 39. Accordingly, even if the first reducing agent passage 27 near the pump 23 is opened to air and the second reducing agent passage 28 is put in the state of an excess negative pressure, the pump 23 side is not refilled with the liquid reducing agent in the storage tank 21.

Next, the ECU 40 stops the energization of the passage selector valve 33 in step S20, stops the energization of the reducing agent injection valve 25 in step S21, and ends the suck back control of the liquid reducing agent.

5. Effects

As described above, in the reducing agent supply apparatus 20 and the method for controlling the reducing agent supply apparatus 20 according to the embodiment, when the suck back control of the liquid reducing agent is performed at the stop of the internal combustion engine, the first reducing agent passage 27 interconnecting the pump 23 and the storage tank 21 is opened to air upon completion of the suck back control. Accordingly, even when an excess negative pressure is generated in the second reducing agent passage 28 because, for example, the reducing agent injection valve 25 clogs, it is possible to prevent the pump 23 side from being refilled with the liquid reducing agent in the storage tank 21.

In addition, in the method for controlling the reducing agent supply apparatus 20 according to the embodiment, upon completion of the suck back control, the pump 23 is stopped, the energization of the three-way selector valve 39 is stopped, and then the first reducing agent passage 27 near the pump 23 is opened to air. Accordingly, it is possible to reliably prevent the liquid reducing agent from flowing to the open air side, thereby reducing a risk that the valve near the open air side is locked by a frozen or solidified liquid reducing agent.

The reducing agent supply apparatus 20 and the method for controlling the reducing agent supply apparatus 20 according to the embodiment are only aspects of the invention and the above embodiments may be modified within the spirit of the invention.

Figure 5:
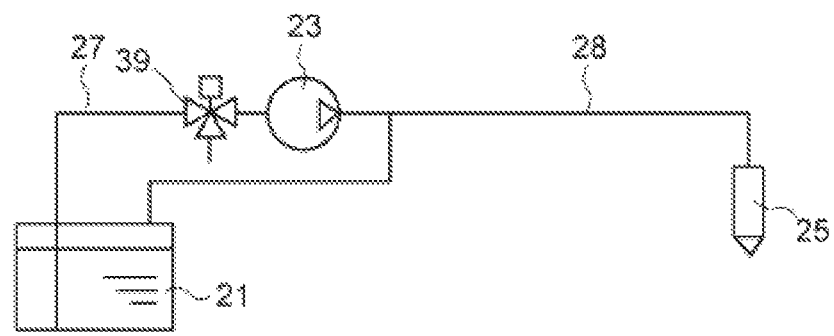
FIG. 5 is a diagram showing an example of the structure of a reducing agent supply apparatus according to another embodiment of the invention.

For example, in the above embodiment, the three-way selector valve 39 is provided in the first reducing agent passage 27 in the storage tank 21. However, as shown in FIG. 5, the three-way selector valve 39 may be provided at a position in the first reducing agent passage 27 closer to the pump 23 than an end of the first reducing agent passage 27 near the storage tank 21. If the three-way selector valve 39 is disposed in such a position, the volume of the first reducing agent passage 27 between the three-way selector valve 39 and the pump 23 can be reduced and the refill amount of the pump 23 side can be reduced.

The invention claimed is:

1. A method for controlling a reducing agent supply apparatus, the method comprising:
   pressure-feeding a liquid reducing agent in a storage tank using a pump;
   injecting via a first reducing agent passage the liquid reducing agent into an exhaust passage of an internal combustion engine through a reducing agent injection valve when the internal combustion engine is operating;
   when the internal combustion engine stops, sucking the liquid reducing agent remaining in the first reducing agent passage back to the storage tank to provide suck back control, wherein the suck back control includes energizing a passage selector valve configured to switch the flow direction of the liquid reducing agent between the storage tank and the reducing agent injection valve; and
   when the suck back control ends, opening a second reducing agent passage to air, the second reducing agent passage interconnecting the pump and the storage tank.

2. The method for controlling a reducing agent supply apparatus according to claim 1, the method further comprising:
   providing the second reducing agent passage with a three-way selector valve,
   providing a communicative connection between the pump and the storage tank when the suck back control is carried out, and
   when the suck back control ends, stopping the pump and opening the second reducing agent passage to air.

3. A reducing agent supply apparatus comprising: an Electronic Control Unit with executable programming for sucking a liquid reducing agent remaining in a first reducing agent passage back to a storage tank when an internal combustion engine stops, the apparatus including a storage tank storing the liquid reducing agent, a pump pressure-feeding the liquid reducing agent in the storage tank, a reducing agent injection valve injecting via the first reducing agent passage the pressure-fed liquid reducing agent into an exhaust passage of the internal combustion engine, and a passage selector valve configured to switch the flow direction of the liquid reducing agent between the storage tank and the reducing agent injection valve, wherein:
   a second reducing agent passage interconnecting the pump and the storage tank is provided with a three-way selector valve,
   the three-way selector valve is switchable between a first state in which the pump communicates with the storage tank and a second state in which the second reducing agent passage is opened to air, and the Electronic Control Unit further comprising programming for determining that
   the first state is reached when the suck back control is carried out and the second state is reached when the suck back control ends.

4. The reducing agent supply apparatus according to claim 3, wherein the three-way selector valve is provided at a position in the second reducing agent passage between the pump and the storage tank, wherein the position is closer to the pump than to the storage tank.

* * * * *